US011307899B2

(12) United States Patent
Krivenok et al.

(10) Patent No.: US 11,307,899 B2
(45) Date of Patent: Apr. 19, 2022

(54) SYSTEM AND METHOD FOR VALIDATING VIRTUAL STORAGE APPLIANCE DEPLOYMENT

(71) Applicant: EMC IP Holding Company, LLC, Hopkinton, MA (US)

(72) Inventors: Dmitry V. Krivenok, Saint-Petersburg (RU); Jared C. Lyon, Waltham, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 203 days.

(21) Appl. No.: 16/527,225

(22) Filed: Jul. 31, 2019

(65) Prior Publication Data

US 2021/0034429 A1 Feb. 4, 2021

(51) Int. Cl.
*G06F 9/50* (2006.01)
*G06F 9/455* (2018.01)
*G06F 16/2455* (2019.01)

(52) U.S. Cl.
CPC ........ *G06F 9/5044* (2013.01); *G06F 9/45558* (2013.01); *G06F 9/5077* (2013.01); *G06F 16/2455* (2019.01); *G06F 2009/45583* (2013.01)

(58) Field of Classification Search
CPC ............... G06F 9/5077; G06F 9/45558; G06F 16/2455; G06F 2009/45583; G06F 3/0617
See application file for complete search history.

(56) References Cited

U.S. PATENT DOCUMENTS

| 10,037,427 B1* | 7/2018 | Krivenok | G06F 9/5077 |
| 10,365,943 B2* | 7/2019 | Voigt | G06F 9/45533 |
| 2010/0199351 A1* | 8/2010 | Protas | G06F 9/45558 726/25 |
| 2017/0046190 A1* | 2/2017 | Sivasubramanian | G06F 11/30 |

* cited by examiner

*Primary Examiner* — Jacob D Dascomb
(74) *Attorney, Agent, or Firm* — Brian J. Colandreo; Mark H. Whittenberger; Holland & Knight LLP (57) ABSTRACT

A method, computer program product, and computing system for generating a virtual storage appliance configuration file. A storage system may be queried for physical configuration information associated with deploying a virtual storage appliance based upon, at least in part, the virtual storage appliance configuration file. One or more virtual storage appliance deployment vulnerabilities associated with the storage system may be identified based upon, at least in part, the virtual storage appliance configuration file and the physical configuration information. A notification including the identified one or more virtual storage appliance deployment vulnerabilities may be generated.

18 Claims, 4 Drawing Sheets

SYSTEM AND METHOD FOR VALIDATING VIRTUAL STORAGE APPLIANCE DEPLOYMENT

TECHNICAL FIELD

This disclosure relates to deploying virtualized storage systems and, more particularly, to validating the deployment of virtualized storage systems.

BACKGROUND

Storing and safeguarding electronic content is of paramount importance in modern business. Accordingly, various methodologies may be employed to protect and distribute such electronic content. For example, high-availability, virtualized storage systems may be utilized to provide users with access to virtual machines (and associated storage) that may be custom tailored to the needs and desires of the user. Unfortunately when deploying virtualized storage systems; configurations may be inadvertently changed that may result in a loss of communication between virtualized components.

SUMMARY OF DISCLOSURE

In one implementation, a computer-implemented method is executed on a computing system and includes generating a virtual storage appliance configuration file. A storage system may be queried for physical configuration information associated with deploying a virtual storage appliance based upon, at least in part, the virtual storage appliance configuration file. One or more virtual storage appliance deployment vulnerabilities associated with the storage system may be identified based upon, at least in part, the virtual storage appliance configuration file and the physical configuration information. A notification including the identified one or more virtual storage appliance deployment vulnerabilities may be generated.

One or more of the following features may be included. Generating the virtual storage appliance configuration file may include receiving one or more parameters of the virtual storage appliance configuration file, wherein the one or more parameters may include at least one of one or more storage configuration parameters for the virtual storage appliance, one or more network configuration parameters for the virtual storage appliance; and one or more host configuration parameters for the virtual storage appliance. Querying the storage system for physical configuration information associated with deploying a virtual storage appliance may include querying a hypervisor of the storage system with one or more application program interfaces (APIs). Identifying the one or more virtual storage appliance deployment vulnerabilities associated with the storage system may include identifying one or more single points of failure in a physical configuration of the storage system associated with deploying the virtual storage appliance. Identifying the one or more virtual storage appliance deployment vulnerabilities associated with the storage system may include identifying at least one of one or more network-related virtual storage appliance deployment vulnerabilities and one or more storage-related virtual storage appliance deployment vulnerabilities. The virtual storage appliance may include a plurality of virtual storage appliance nodes deployed on separate virtual machines. Deployment of the virtual storage appliance may be prevented in response to identifying the one or more virtual storage appliance deployment vulnerabilities.

In another implementation, a computer program product resides on a computer readable medium and has a plurality of instructions stored on it. When executed by a processor, the instructions cause the processor to perform operations including generating a virtual storage appliance configuration file. A storage system may be queried for physical configuration information associated with deploying a virtual storage appliance based upon, at least in part, the virtual storage appliance configuration file. One or more virtual storage appliance deployment vulnerabilities associated with the storage system may be identified based upon, at least in part, the virtual storage appliance configuration file and the physical configuration information. A notification including the identified one or more virtual storage appliance deployment vulnerabilities may be generated.

One or more of the following features may be included. Generating the virtual storage appliance configuration file may include receiving one or more parameters of the virtual storage appliance configuration file, wherein the one or more parameters may include at least one of one or more storage configuration parameters for the virtual storage appliance, one or more network configuration parameters for the virtual storage appliance; and one or more host configuration parameters for the virtual storage appliance. Querying the storage system for physical configuration information associated with deploying a virtual storage appliance may include querying a hypervisor of the storage system with one or more application program interfaces (APIs). Identifying the one or more virtual storage appliance deployment vulnerabilities associated with the storage system may include identifying one or more single points of failure in a physical configuration of the storage system associated with deploying the virtual storage appliance. Identifying the one or more virtual storage appliance deployment vulnerabilities associated with the storage system may include identifying at least one of one or more network-related virtual storage appliance deployment vulnerabilities and one or more storage-related virtual storage appliance deployment vulnerabilities. The virtual storage appliance may include a plurality of virtual storage appliance nodes deployed on separate virtual machines. Deployment of the virtual storage appliance may be prevented in response to identifying the one or more virtual storage appliance deployment vulnerabilities In another implementation, a computing system includes a processor and a memory system configured to perform operations including generating a virtual storage appliance configuration file. A storage system may be queried for physical configuration information associated with deploying a virtual storage appliance based upon, at least in part, the virtual storage appliance configuration file. One or more virtual storage appliance deployment vulnerabilities associated with the storage system may be identified based upon, at least in part, the virtual storage appliance configuration file and the physical configuration information. A notification including the identified one or more virtual storage appliance deployment vulnerabilities may be generated.

One or more of the following features may be included. Generating the virtual storage appliance configuration file may include receiving one or more parameters of the virtual storage appliance configuration file, wherein the one or more parameters may include at least one of one or more storage configuration parameters for the virtual storage appliance, one or more network configuration parameters for the virtual storage appliance; and one or more host configuration parameters for the virtual storage appliance. Querying the storage system for physical configuration information associated with deploying a virtual storage appliance may include querying a hypervisor of the storage system with one or more application program interfaces (APIs). Identifying the one or more virtual storage appliance deployment vulnerabilities associated with the storage system may include identifying one or more single points of failure in a physical configuration of the storage system associated with deploying the virtual storage appliance. Identifying the one or more virtual storage appliance deployment vulnerabilities associated with the storage system may include identifying at least one of one or more network-related virtual storage appliance deployment vulnerabilities and one or more storage-related virtual storage appliance deployment vulnerabilities. The virtual storage appliance may include a plurality of virtual storage appliance nodes deployed on separate virtual machines. Deployment of the virtual storage appliance may be prevented in response to identifying the one or more virtual storage appliance deployment vulnerabilities.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
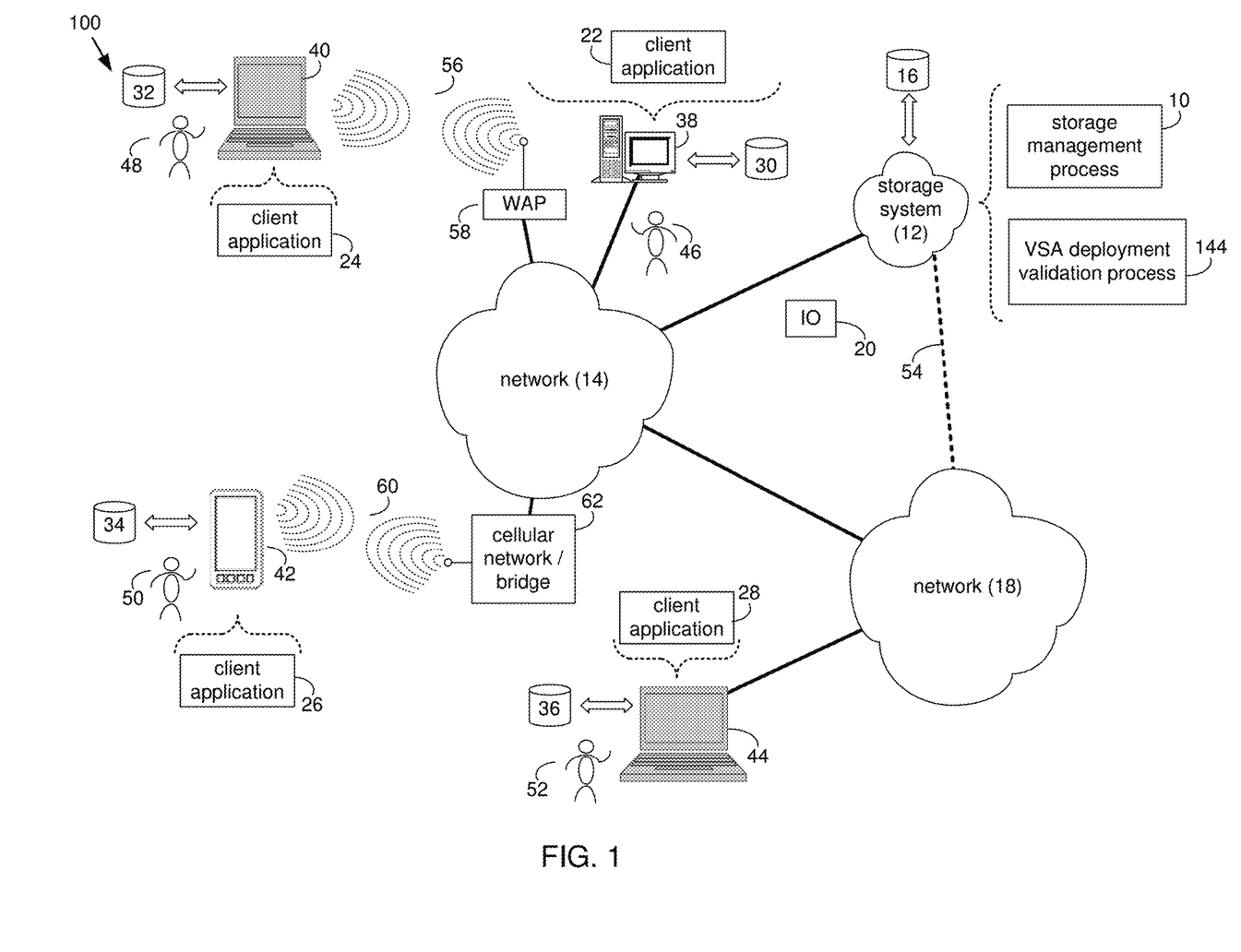
FIG. 1 is a diagrammatic view of a storage system, a virtual storage appliance (VSA) deployment validation process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RANI); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
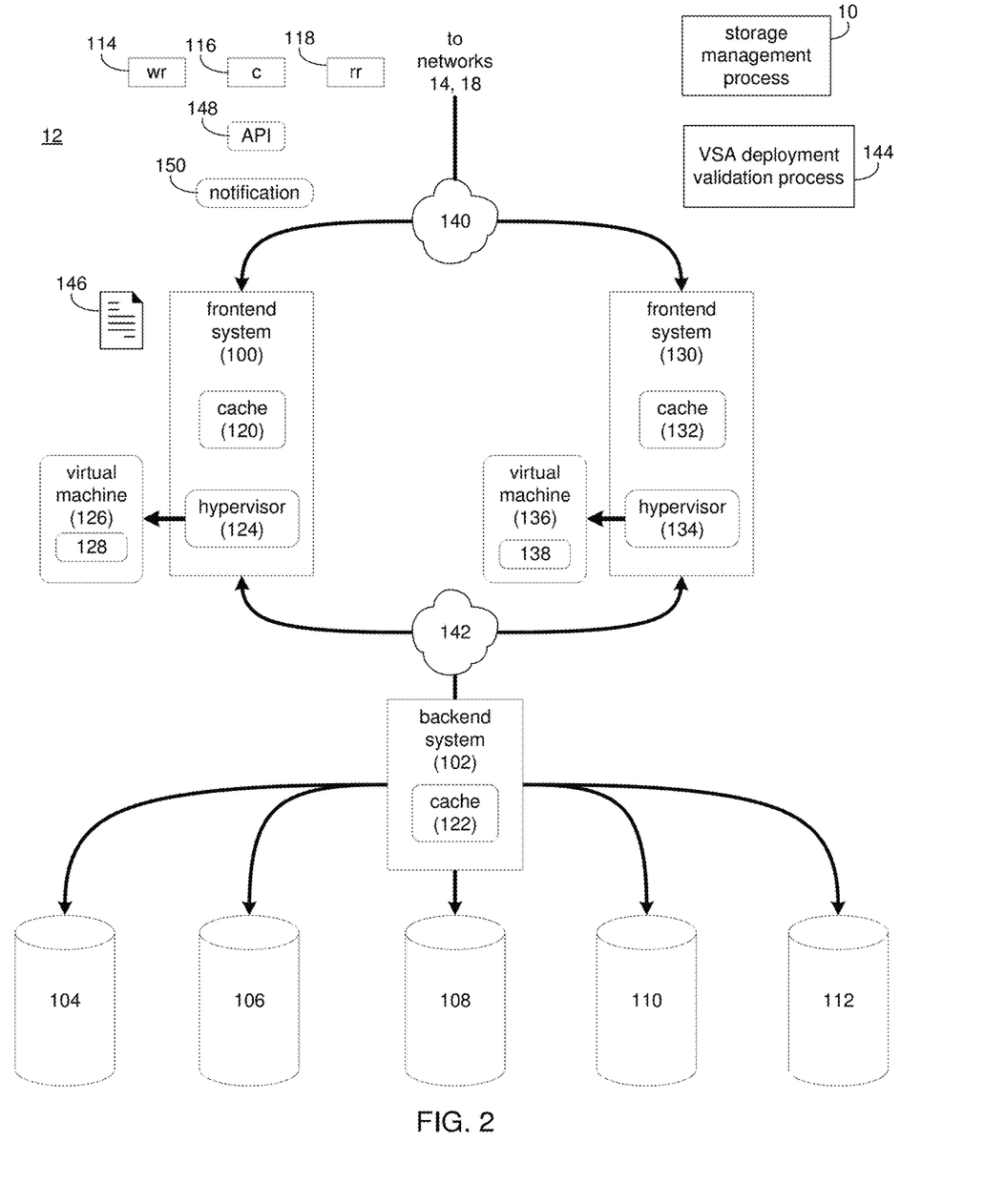
FIG. 2 is a diagrammatic view of the storage system of FIG. 1 according to one or more embodiments of the present disclosure.

Storage System:

Referring also to FIG. 2, there is shown a general and illustrative implementation of storage system 12 (or a portion thereof). In this general and illustrative implementation, data storage system 12 may include frontend system 100, backend system 102 and a plurality of storage targets (e.g. storage targets 104, 106, 108, 110, 112). Storage targets 104, 106, 108, 110, 112 may be configured to provide various levels of performance and/or high availability. For example, one or more of storage targets 104, 106, 108, 110, 112 may be configured as a RAID 0 array, in which data is striped across storage targets. By striping data across a plurality of storage targets, improved performance may be realized. However, RAID 0 arrays do not provide a level of high availability. Accordingly, one or more of storage targets 104, 106, 108, 110, 112 may be configured as a RAID 1 array, in which data is mirrored between storage targets. By mirroring data between storage targets, a level of high availability is achieved as multiple copies of the data are stored within storage system 12.

While storage targets 104, 106, 108, 110, 112 are discussed above as being configured in a RAID 0 or RAID 1 array, this is for illustrative purposes only and is not intended to be a limitation of this disclosure, as other configurations are possible. For example, storage targets 104, 106, 108, 110, 112 may be configured as a RAID 3, RAID 4, RAID 5, RAID 6 or RAID 7 array. Additionally, storage targets 104, 106, 108, 110, 112 need not be limited to any type of RAID systems, as other configurations are possible and are considered to be within the scope of this disclosure. For example, storage targets 104, 106, 108, 110, 112 may be configured as e.g., scale-out SANs (such as VMWare vSAN™ and Dell EMC Scale IO™).

While in this particular example, storage system 12 is shown to include five storage targets (e.g. storage targets 104, 106, 108, 110, 112), this is for illustrative purposes only and is not intended to be a limitation of this disclosure. Specifically, the actual number of storage targets may be increased or decreased depending upon e.g. the level of redundancy/performance/capacity required.

One or more of storage targets 104, 106, 108, 110, 112 may be configured to store coded data, wherein such coded data may allow for the regeneration of data lost/corrupted on one or more of storage targets 104, 106, 108, 110, 112. Examples of such coded data may include but is not limited to parity data and Reed-Solomon data. Such coded data may be distributed across all of storage targets 104, 106, 108, 110, 112 or may be stored within a specific storage device. Examples of storage targets 104, 106, 108, 110, 112 may include one or more electro-mechanical hard disk drives and/or solid-state/flash devices.

Storage system 12 may execute all or a portion of storage management process 10. The instruction sets and subroutines of storage management process 10, which may be stored on a storage device (e.g., storage device 16) coupled to frontend system 100 and/or backend system 102, may be executed by one or more processors (not shown) and one or more memory architectures (not shown) included within frontend system 100 and/or backend system 102. Storage device 16 may include but is not limited to: a hard disk drive; a RAID device; random access memory (RAM); read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 114 (i.e. a request that content 116 be written to storage system 12) and data read request 118 (i.e. a request that content 116 be read from storage system 12).

During operation of frontend system 100, content 116 to be written to storage system 12 may be processed by frontend system 100. Additionally/alternatively and when frontend system 100 is configured as an application server, content 116 to be written to storage system 12 may be internally generated by frontend system 100.

Frontend system 100 may include frontend cache memory system 120. Examples of frontend cache memory system 120 may include but are not limited to a volatile, solid-state, cache memory system (e.g., a dynamic RAM cache memory system) and/or a non-volatile, solid-state, cache memory system (e.g., a flash-based, cache memory system).

Frontend system 100 may initially store content 116 within frontend cache memory system 120. Depending upon the manner in which frontend cache memory system 120 is configured, frontend system 100 may immediately provide content 116 to backend system 102 (if frontend cache memory system 120 is configured as a write-through cache) or may subsequently provide content 116 to backend system 102 (if frontend cache memory system 120 is configured as a write-back cache).

Backend system 102 may include backend cache memory system 122. Examples of backend cache memory system 122 may include but are not limited to a volatile, solid-state, cache memory system (e.g., a dynamic RAM cache memory system) and/or a non-volatile, solid-state, cache memory system (e.g., a flash-based, cache memory system). During operation of backend system 102, content 116 to be written to storage targets 104, 106, 108, 110, 112 may be received from frontend system 100. Backend system 112 may initially store content 116 within backend cache memory system 122 prior to being stored on e.g. one or more of storage targets 104, 106, 108, 110, 112.

Frontend system 100 may include and/or execute a hypervisor (e.g., hypervisor 124) that may allow for the execution of one or more virtual machines (e.g., virtual machine 126). As is known in the art, a hypervisor (e.g., hypervisor 124) is a piece of computer software, firmware and/or hardware that creates and runs virtual machines (e.g., virtual machine 126), wherein the hypervisor (e.g., hypervisor 124) may present and manage a guest operating system on a virtual operating platform. Therefore, multiple instantiations of a variety of operating systems may be effectuated on shared hardware resources. For example, Linux™, Windows™, and Mac™ operating system instantiations may all run on a single physical x86 system.

Accordingly, virtual machine 126 may be an emulation of a physical computer system. For example, virtual machine 126 may be configured to provide the functionality of a Windows™ based computing system and may allow for the execution of Windows-based application 128, while another virtual machine may be configured to provide the functionality of a Linux™ based computing system and may allow for the execution of a Linux-based application. While hypervisor 124 is shown with one virtual machine (e.g., virtual machine 126), it will be appreciated that hypervisor 124 may create and run any number of virtual machines within the scope of the present disclosure.

Frontend system 100 and/or backend system 102 may include one or more physical hardware components (not shown) that may be configurable by hypervisor 124 to form virtual machines (e.g., virtual machines 126). Examples of these physical hardware components may include but are not limited to: hard drives (e.g., storage targets 104, 106, 108, 110, 112), RAID arrays (e.g., formed by storage targets 104, 106, 108, 110, 112), host bus adapters, network controllers, network systems and components, processor cores, cache memory architectures (e.g., frontend cache memory system 120 and/or backend cache memory system 122), volatile memory architectures, and persistent memory architectures. Accordingly and when virtual machine 126 is executed on hypervisor 124, various portions of these physical hardware components may be assigned to/mapped to virtual machine 126.

In order to provide a higher-level of availability and/or a higher level of performance, storage system 12 may include one or more additional frontend systems (e.g., frontend systems 130) that may be configured in a manner similar to frontend system 100. Therefore, frontend system 130 may include a frontend cache system (e.g., frontend cache 132) and may include and/or execute a hypervisor (e.g., hypervisor 134) that may allow for the execution of one or more virtual machines (e.g., virtual machine 136), which may run applications (e.g., applications 138). While an example with two frontend systems has been described above, it will be appreciated that any number of frontend systems may be used within the scope of the present disclosure.

The various components of storage system 12 may be interconnected with (and may communicate through) one or more communication networks (e.g., networks 140, 142).

Virtual Storage Appliance (VSA) Deployment Validation Process:

As will be discussed below in greater detail, virtual storage appliance (VSA) deployment validation process 144 may be configured to allow for the automated deployment of multiple virtual storage appliance (VSA) nodes within storage system 12. The instruction sets and subroutines of VSA deployment validation process 144, which may be stored on a storage device (e.g., storage device 16) coupled to frontend system 100, frontend system 130, and/or backend system 102, may be executed by one or more processors (not shown) and one or more memory architectures (not shown) included within frontend system 100, frontend system 130, and/or backend system 102.

Figure 3:
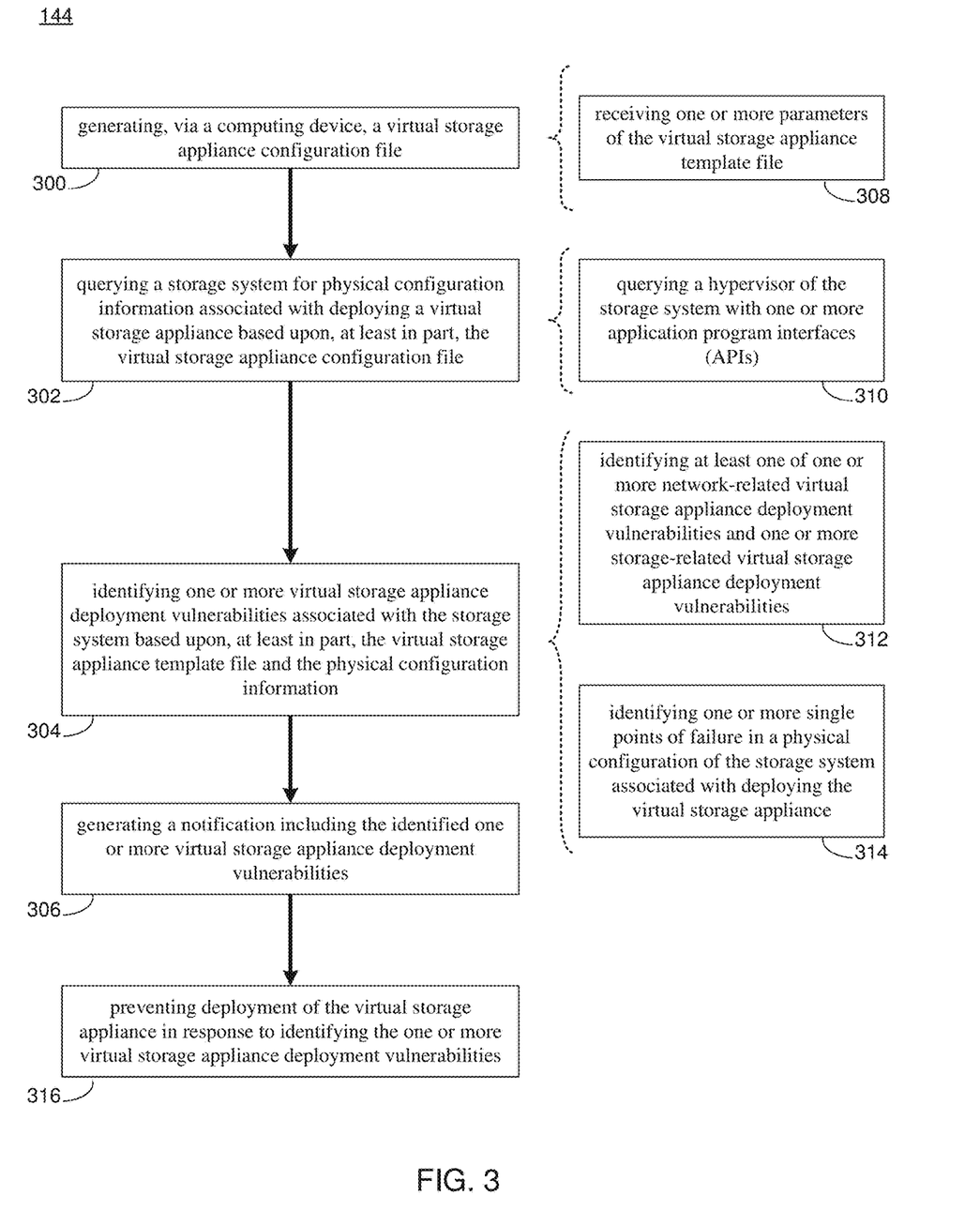
FIG. 3 is a flow chart of the virtual storage appliance (VSA) deployment validation process of FIG. 1 according to one or more embodiments of the present disclosure.
Figure 4:
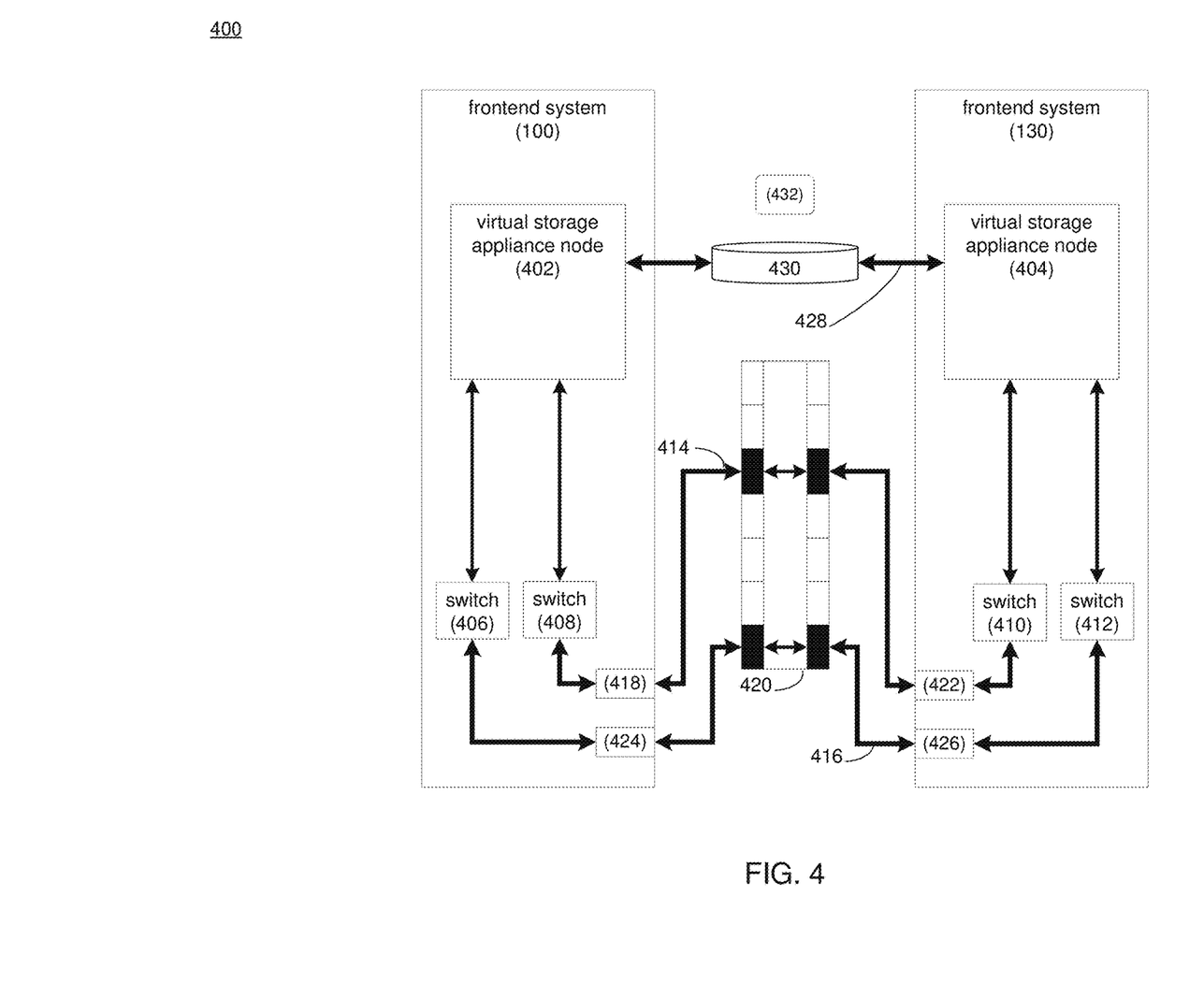
FIG. 4 is a virtualized view of the storage system of FIG. 1 according to one or more embodiments of the present disclosure.

Referring also to FIGS. 2-4 and in some embodiments, VSA deployment validation process 144 may generate 300, via a computing device, a virtual storage appliance configuration file. A storage system may be queried 302 for physical configuration information associated with deploying a virtual storage appliance based upon, at least in part, the virtual storage appliance configuration file. One or more virtual storage appliance deployment vulnerabilities associated with the storage system may be identified 304 based upon, at least in part, the virtual storage appliance configuration file and the physical configuration information. A notification including the identified one or more virtual storage appliance deployment vulnerabilities may be generated 308.

In some embodiments, a user (e.g., user 46 using client device 38) may desire to configure a multi-node virtual storage appliance. However, configuring multiple nodes may lead to inconsistencies. For example, with so many manual steps and some "non-standard" configuration operations, it is easily foreseeable that multi-node virtual storage appliance configuration may be error prone and may cause the deployment on virtual machines to fail. As will be discussed in greater detail below, embodiments of the present disclosure may allow a user to be warned of virtual storage appliance deployment vulnerabilities associated with a storage system. For example, suppose a user seeks to deploy a virtual storage appliance with various parameters (as will be discussed in greater detail below), the virtual storage appliance may suffer from one or more deployment vulnerabilities. As will be discussed below, virtual storage appliance deployment vulnerabilities may generally include virtual storage appliance configurations and/or physical configurations of the storage system that may prevent a virtual storage appliance from being deployed or may expose the virtual storage appliance or one of its components to potential failure. As such and regardless of whether the user's virtual storage appliance configuration can be deployed, embodiments of the present disclosure may notify a user if their configuration is vulnerable to a potential failure. In this manner, virtual storage appliance configurations may be validated against possible vulnerabilities before deployment.

In some embodiments, VSA deployment validation process 144 may generate 300 a virtual storage appliance configuration file. A virtual storage appliance configuration file (e.g., virtual storage appliance configuration file 146) may generally include a configuration file used for generating and deploying a virtual storage appliance. In some embodiments, generating the virtual storage appliance configuration file (e.g., virtual storage appliance configuration file 146) may include receiving 308 one or more parameters of the virtual storage appliance configuration file. In some embodiments, the one or more parameters may include at least one of one or more storage configuration parameters for the virtual storage appliance, one or more network configuration parameters for the virtual storage appliance, and one or more host configuration parameters for the virtual storage appliance.

For example and in some embodiments, storage configuration parameters may generally include configuration specifications for storage parameters (e.g., disk sizes, RAID configurations, number of disks, size of RAM that a virtual storage appliance will use, operating system requirements, etc.). For example, user 46 may provide, via application 22, the one or more storage configuration parameters that are used to generate virtual storage appliance configuration file 146. In some embodiments, VSA deployment validation process 144 may provide one or more default storage configurations that may be modified by a user. In some embodiments, network configuration parameters may generally include configuration settings for network parameters (e.g., the number of virtual network adapters, the network connection type (e.g., Bridged, NAT, Host-only or Custom), internal networks, external networks, the configuration of one or more virtual local area networks (VLANs), etc.). For example, user 46 may provide, via application 22, the one or more network configuration parameters that are used to generate virtual storage appliance configuration file 146. In some embodiments, VSA deployment validation process 144 may provide one or more default network configurations that may be modified by a user. In some embodiments, host configuration parameters may generally include configuration parameters that control the ability to configure hosts (e.g., frontend systems 100, 130). Examples of host configuration parameters may generally include specifying a host or hosts to deploy the virtual storage system, firmware requirements, configuring hyperthreading in a host, network and/or storage settings specific to each host, etc. In some embodiments, user 46 may provide, via application 22, the one or more host configuration parameters that are used to generate virtual storage appliance configuration file 146. In some embodiments, VSA deployment validation process 144 may provide one or more default host configuration parameters that may be modified by a user. While three examples of virtual storage appliance parameters have been provided, it will be appreciated that other parameters may be received in the configuration of a virtual storage appliance within the scope of the present disclosure.

In some embodiments, the virtual storage appliance configuration file may include a number of virtual storage appliance nodes. A virtual storage appliance (VSA) node may generally include a storage node that runs as a virtual machine instead of on purpose-built hardware. As will be discussed in greater detail below, virtual storage appliance nodes may be based upon the hardware/resources of a frontend system and may each be configured to access a common set of storage devices. For example, one or more logical storage devices (e.g., LUNs) may be formed from one or more physical storage devices and each virtual storage appliance node may work cooperatively (e.g., in an active-active or active-passive fashion) so that they each virtual storage appliance node may provide access to these logical storage devices. In some embodiments, a user (e.g., user 46) may designate a number of virtual storage appliance nodes to configure in the virtual storage appliance configuration file (e.g., virtual storage appliance configuration file 146) using an application (e.g., application 22). In this manner and as will be discussed in greater detail below, a user may deploy a multi-node virtual storage appliance or virtual storage system.

In some embodiments, VSA deployment validation process 144 may include a user interface or tool configured to receive the one or more virtual storage appliance configuration parameters and/or number of virtual storage appliance nodes to generate a virtual storage appliance configuration file. In this manner, a user may provide the one or more virtual storage appliance configuration parameters and/or number of virtual storage appliance nodes to the user interface/tool of VSA deployment validation process 144 and VSA deployment validation process 144 may generate 300 the virtual storage appliance configuration file.

In some embodiments, VSA deployment validation process 144 may query 302 a storage system for physical configuration information associated with deploying a virtual storage appliance based upon, at least in part, the virtual storage appliance configuration file. As discussed above and in some embodiments, deploying a virtual storage appliance may include the mapping of virtual components of the virtual storage appliance to physical components of a storage system. In some embodiments, virtual storage appliance configuration file 146 may define the virtual components or virtual machines to be instantiated by a hypervisor (e.g., hypervisors 124, 134). However, at the time of configuration, it may be unclear to the user if the physical configuration of storage system 12 can support the virtual storage appliance. Further, it may be even more unclear to the user whether the virtual storage appliance deployed on the physical configuration of storage system 12 is vulnerable to failure or other issues. As will be discussed in greater detail below, VSA deployment validation process 144 may query 302 the storage system for physical configuration information associated with deploying the virtual storage appliance based upon, at least in part, the virtual storage appliance configuration file. In some embodiments, VSA deployment validation process 144 may query 302 the hypervisor (e.g., hypervisors 124, 134) to determine the virtual-to-physical mapping of virtual components of virtual storage appliance configuration file 146 to physical components of storage system 12. In this manner and as will be discussed in greater detail below, VSA deployment validation process 144 may identify 304 one or more virtual storage appliance vulnerabilities.

For example and referring also to FIG. 4, there is shown one example of the manner in which a virtualized storage appliance (e.g., virtualized storage appliance 400) may be deployed within storage system 12. As discussed above, the various hypervisors (e.g., hypervisors 124, 130) may allow for the execution of virtual machines (e.g., virtual machine 126 via hypervisor 124, virtual machine 136 via hypervisor 134), wherein these virtual machines may allow for the execution of various applications (e.g., applications 128, 138).

In some embodiments, a plurality of virtual storage appliance nodes may each be deployed on or as a separate virtual machine. For example, a first virtual storage appliance node (e.g., virtual storage appliance node 402) and a second virtual storage appliance node (e.g., virtual storage appliance node 404) may be deployed within storage system 12 and may be generated based upon the physical hardware of storage system 12 (in the manner described above). In some embodiments and for high availability purposes, virtual storage appliance node 402 may be executed on frontend system 100 via virtual machine 126, while virtual storage appliance node 404 may be executed on frontend system 130 via virtual machine 136, wherein the combination of virtual storage appliance node 402 and virtual storage appliance node 404 may form high-availability, multi-node virtual storage appliance 400.

In another example, virtual storage appliance nodes 402, 404 may be configured by VSA deployment validation process 144 to allow virtual storage appliance nodes 402, 404 to each access storage targets 104, 106, 108, 110, 112. For example, one or more logical storage devices (e.g., LUNs) may be formed from the one or more physical storage devices (e.g., storage targets 104, 106, 108, 110, 112), wherein virtual storage appliance nodes 402, 408 may work cooperatively (e.g., in an active-active or active-passive fashion) so that they both may provide access to these logical storage devices.

In some embodiments and in order to enable virtual storage appliance nodes 402, 404 to work cooperatively and coordinate access to the logical storage devices (e.g., LUNs) formed from storage targets 104, 106, 108, 110, 112, virtual storage appliance nodes 402, 404 may communicate with each other to avoid a "split brain" situation, wherein at least two virtual storage appliance nodes write data to these logical storage devices without regard for what the other virtual storage appliance nodes are doing (which may result in data loss and/or data corruption).

In some embodiments, VSA deployment validation process 144 may generate one or more private internal network switches when deploying a virtual storage appliance (e.g., virtual storage appliance 400). Referring again to the example of FIG. 4 and to further enhance the level of high availability, virtual storage appliance nodes 402, 404 may be coupled to (i.e., communicate with) each other using a plurality of different communication paths and one or more private internal network switches (e.g., network switches 406, 408 for virtual storage appliance node 402 using hypervisor 124 of frontend system 100 and network switches 410, 412 for virtual storage appliance node 404 using hypervisor 134 of frontend system 130.

In some embodiments, VSA deployment validation process 144 may connect the configured plurality of virtual storage appliance nodes to the one or more private internal network switches. In some embodiments, VSA deployment validation process 144 may establish a data communication channel (e.g., data communication channel 414) between a first virtual storage appliance node (e.g., virtual storage appliance node 402) and a second virtual storage appliance node (e.g., virtual storage appliance node 404) within storage system 12, wherein data communication channel 414 may include a network-based data communication path.

VSA deployment validation process 144 may also establish a heartbeat communication channel (e.g., heartbeat communication channel 416) between the first virtual storage appliance (e.g., virtual storage appliance node 402) and the second virtual storage appliance (e.g., virtual storage appliance node 404) within storage system 12. Heartbeat communication channel 416 may include at least one network-based heartbeat communication path and/or at least one storage-based heartbeat communication path.

In some embodiments, communication path 416 may be network-based communication paths and may allow virtual storage appliance nodes 402, 404 to communicate via one or more virtualized data communication networks, an example of which may include but is not limited to a virtualized IP communications network.

Additionally and in the interest of providing a high level of availability, each of communication paths 414, 416 may be coupled to virtual storage appliance nodes 406, 408, 410 using a virtualized connection that may be mapped to/upon separate and distinct underlying network hardware.

For example, communication path 414 may be mapped onto a private internal network switch (e.g., private internal network switch 408) and a network interface adapter (e.g., network interface adapter 418) within e.g., frontend system 100; a physical switch (e.g., physical switch 420); and a network interface adapter (e.g., network interface adapter 422) and a private internal network switch (e.g., private internal network switch 410) within e.g., frontend system 130.

Further, communication path 416 may be mapped onto a private internal network switch (e.g., private internal network switch 406) and a network interface adapter (e.g., network interface adapter 424) within e.g., frontend system 100; a physical switch (e.g., physical switch 420); and a network interface adapter (e.g., network interface adapter 426) and a private internal network switch (e.g., private internal network switch 412) within e.g., frontend system 130.

In some embodiments, communication path 414 may be configured to allow virtual storage appliance node 402 and virtual storage appliance node 404 to communicate by routinely transferring data/messages between virtual storage appliance node 402 and virtual storage appliance node 404. Accordingly, in the event that at least one virtual storage appliance node does not receive a message from the other virtual storage appliance node for a defined period of time, that other virtual storage appliance node may be deemed to be offline/unavailable.

In some embodiments, communication via communication path 414 may be effectuated via e.g., a CMI protocol and CMI driver (e.g., CMId), such as a Common Messaging Interface developed by Dell EMC of Hopkinton, Mass.

In some embodiments, communication path 416 may be configured to allow virtual storage appliance nodes 402, 404 to communicate by repeatedly providing heartbeat signals to each other to indicate their continued operation. Accordingly, in the event that at least one virtual storage appliance node does not receive a heartbeat signal from another virtual storage appliance node for a defined period of time, that other virtual storage appliance node may be deemed to be offline/unavailable.

In some embodiments, communication via communication path 416 may be effectuated via e.g., an HB protocol and HB driver (e.g., net_ping), which is a heartbeat protocol developed by Dell EMC of Hopkinton, Mass.

In some embodiments, communication path 428 may be a storage-based communication path and may allow virtual storage appliance node 402 and virtual storage appliance node 404 to communicate via one or more virtualized storage devices (e.g., virtualized storage device 430 for communication path 428, an example of which includes a LUN (i.e., logical storage device) formed from one or more physical storage devices (e.g., storage targets 104, 106, 108, 110, 112).

Additionally and in the interest of providing a high level of availability, communication path 428 may be coupled to virtual storage appliance node 402 and virtual storage appliance node 404 using a virtualized connection that may be mapped to/upon separate and distinct underlying network hardware.

Communication path 428 may be configured to allow virtual storage appliance node 402 and virtual storage appliance node 404 to communicate by providing heartbeat signals that indicate their continued operation and are written to e.g., a defined storage space within virtualized storage device 430. For example, each of virtual storage appliance node 402 and virtual storage appliance node 404 may provide heartbeat signals via communication path 428 to virtualized storage device 430, wherein these heartbeat signals may be written to defined storage space 432 using e.g., sector size IO to virtualized storage device 430 (or a partition thereof).

For example and concerning communication path 428, virtual storage appliance node 402 may write its heartbeat signal to defined storage space 432 and read the last defined storage space entry written by virtual storage appliance node 404, wherein virtual storage appliance node 404 may write its heartbeat signal to defined storage space 432 and read the last defined storage space entry written by virtual storage appliance node 402. These entries into defined storage space 432 may include a status indicator and an incrementing counter, wherein each entry is assigned a unique incremented value. Accordingly, if the incremented value of the last heartbeat signal entry of a particular virtual storage appliance node is too old/has expired, that virtual storage appliance node may be deemed to be offline/unavailable. For example, if the incremented of the last heartbeat signal entry of a particular virtual storage appliance node has not changed for a defined number of read operations, that virtual storage appliance node may be deemed as not being visible.

In some embodiments, communication via communication path 428 may be effectuated via e.g., an HB protocol and HB driver (e.g., block_ping), which is a heartbeat protocol developed by Dell EMC of Hopkinton, Mass.

As shown above in at least FIG. 4, virtual storage appliance nodes 402, 404 may be connected using several private internal network switches (e.g., private internal network switches 406, 408, 410, 412) for routing virtual machine network interfaces to specific host network interface adapters, which may be connected using one or more physical switches (e.g., physical switch 420). Inside the physical switches (e.g., physical switch 420), virtual local area networks (VLANs) may be generated by VSA deployment validation process 144 to isolate pairs of network interface adapters to their own virtual networks. For example, the arrows within physical switch 420 may represent a VLAN that isolates pairs of network interface adapters to their own virtual networks.

In some embodiments, VSA deployment validation process 144 may connect the configured plurality of virtual storage appliance nodes to one or more storage devices. For example, and in response to configuring the multi-node virtual storage system as discussed above, the multi-node virtual storage appliance system may be configured to allow virtual storage appliance nodes 402, 404 to each access storage targets 104, 106, 108, 110, 112, wherein virtual storage appliance nodes 402, 404 may work cooperatively (e.g., in an active-active or active-passive fashion). Accordingly, VSA deployment validation process 144 may connect the one or more storage devices (e.g., storage targets 104, 106, 108, 110, 112) required for an initial boot up of the virtual storage appliance nodes to the virtual storage appliance nodes (e.g., virtual storage appliance nodes 402, 404).

In some embodiments, querying 302 the storage system for physical configuration information associated with deploying a virtual storage appliance may include querying 310 a hypervisor of the storage system with one or more application program interfaces (APIs). Referring again to the example of FIG. 2 and in some embodiments, VSA deployment validation process 144 may query 310 hypervisor 124 with one or more APIs (e.g., API 148) to determine how hypervisor 124 maps the virtual components (e.g., virtual machine 126, virtual switches 406, 408, virtual storage devices, etc.) of virtual storage appliance configuration file 146 to physical components (e.g., frontend system 100, physical switch 420, storage devices 104, 106, 108, 110, 112, etc.) of storage system 12. In this manner, VSA deployment validation process 144 may query 310 hypervisor 124 for physical configuration information associated with deploying the virtual storage appliance. For example, API 148 may query 310 hypervisor 124 for information regarding the deployment of virtual storage appliance node 402 on virtual machine 126. In another example, API 128 may query 310 hypervisor 124 for physical configuration information regarding the deployment of virtual switches 406, 408. While examples have been provided of querying 310 hypervisor 124, it will be appreciated that any hypervisor (e.g., hypervisor 134) may be queried 310 within the scope of the present disclosure. It will also be appreciated that any API or any number of APIs may be used to query 310 a hypervisor for physical configuration information associated with deploying the virtual storage appliance based upon, at least in part, the virtual storage appliance configuration file.

In some embodiments, querying 302 the storage system for physical configuration information associated with deploying a virtual storage appliance based upon, at least in part, the virtual storage appliance configuration file may include deploying one or more minimalistic virtual machines via the hypervisor. For example and in some embodiments, VSA deployment validation process 144 may deploy a minimalistic version (e.g., a simple or barebones configuration) of the virtual components specified in the virtual storage appliance configuration file via the hypervisor. In this example, the hypervisor (e.g., hypervisors 124, 134) may map the minimalistic version of the virtual component(s) to physical component(s) of storage system 12. In this manner, VSA deployment validation process 144 may query 302 the hypervisor for the physical configuration information of the physical component(s) used to deploy the minimalistic version of the virtual component(s) specified in the virtual storage appliance configuration file.

As discussed above, the virtual-to-physical mapping of virtual component to physical components by the hypervisor (e.g., hypervisors 124, 134) queried 302 by VSA deployment validation process 144 may be utilized by VSA deployment validation process 144 to identify 304 one or more virtual storage appliance deployment vulnerabilities. In some embodiments, VSA deployment validation process 144 may identify 304 one or more virtual storage appliance deployment vulnerabilities associated with the storage system based upon, at least in part, the virtual storage appliance configuration file and the physical configuration information. A virtual storage appliance deployment vulnerability may generally include virtual storage appliance configurations and/or physical configurations of the storage system that may prevent a virtual storage appliance from being deployed or may expose the virtual storage appliance or one of its components to potential failure. For example and as discussed above, a virtual storage appliance may include a plurality of virtual storage appliance nodes configured with one or more heartbeat communication channels and one or more messaging channels. Accordingly, it may be difficult for a user to determine how their virtual storage appliance configuration will be mapped by the hypervisor to physical components of the storage system and/or how the mapping of the virtual components to physical components may prevent a virtual storage appliance from being deployed or may expose the virtual storage appliance or one of its components to potential failure.

In some embodiments, identifying 304 the one or more virtual storage appliance deployment vulnerabilities associated with the storage system may include identifying 312 one or more network-related virtual storage appliance deployment vulnerabilities and/or one or more storage-related virtual storage appliance deployment vulnerabilities. A network-related virtual storage appliance deployment vulnerability may generally include a vulnerability in the virtual-to-physical mapping of virtual network components to physical network components of the storage system that may prevent a virtual storage appliance from deploying or that may expose a deployed virtual storage appliance to a potential failure. For example, VSA deployment validation process 144 may determine a network-related virtual storage appliance deployment vulnerability in the network fabric. Suppose, for example purposes only, that a network fabric includes a plurality of virtual switches. However, further suppose that querying 302 the storage system (e.g., hypervisor 124) reveals that the plurality of virtual switches are mapped to a single physical switch (e.g., physical switch 420). Accordingly, failure of physical switch 420 may cause failure or unavailability of virtual switches. In this example, VSA deployment validation process 144 may identify 312 a network-related virtual storage appliance deployment vulnerability in the deployment of virtual machines on a single switch.

In another example, suppose VSA deployment validation process 144 queries 302 storage system 12 based upon, at least in part, virtual storage appliance configuration file 146 and determines that a plurality of port groups for e.g., heartbeat traffic use are mapped to a single physical uplink or network adapter (e.g., network adapter 418). In this example, failure of the single physical network adapter may cause failure of a plurality of heartbeat communication channel between virtual storage appliance nodes (e.g., virtual storage appliance nodes 402, 404). Accordingly, VSA deployment validation process 144 may identify 312 the mapping of the plurality of port groups used for heartbeat traffic to physical network adapter as a network-related virtual storage appliance deployment vulnerability. While two examples of network-related vulnerabilities have been provided, it will be appreciated that other types of network-related virtual storage appliance deployment vulnerabilities may be identified according to embodiments of the present disclosure.

In some embodiments, a storage-related virtual storage appliance deployment vulnerability may generally include vulnerability in the virtual-to-physical mapping of virtual storage components to physical storage components of the storage system that may prevent a virtual storage appliance from deploying or that may expose a deployed virtual storage appliance to a potential failure. For example, suppose VSA deployment validation process 144 queries 302 storage system 12 to determine that a plurality of virtual drives are mapped to the same logical unit number (LUN). Failure or unavailability of the storage device(s) associated with the LUN (e.g., LUN 430) may cause the plurality of virtual drives to fail. Further, suppose that one or more of the virtual storage devices is associated with a storage-based heartbeat communication channel (e.g., communication channel 428). Failure of the LUN (e.g., LUN 430) could cause the virtual storage devices to fail which in turn could cause the storage-based heartbeat communication channel (e.g., communication channel 428) to fail. In this example, VSA deployment validation process 144 may identify 312 the mapping of the virtual storage devices used for a storage-based heartbeat communication channel to the same LUN as a storage-related virtual storage appliance deployment vulnerability.

In another example, VSA deployment validation process 144 may query 302 storage system 12 and determine that a plurality of LUNs are owned by a single host (e.g., frontend system 100) in the underlying storage array (e.g., data array 112) and the plurality of LUNs are used with a storage-based heartbeat communication channel (e.g., communication channel 428). In this example, a failover time of the LUNs to another host may be too high (e.g., the latency may be too high) for heartbeat communications between the virtual storage appliance nodes (e.g., virtual storage appliance nodes 402, 404). Accordingly, VSA deployment validation process 144 may identify 312 the configuration of the storage-based heartbeat communication channel with a plurality of LUNs owned by the same host as a storage-related virtual storage appliance deployment vulnerability. For example and in order to avoid storage heartbeat latency issues, this virtual storage appliance deployment vulnerability may be avoided by configuring storage heartbeat virtual disks/partitions over LUNs owned by different storage processors/hosts of the underlying storage array. While two examples of storage-related vulnerabilities have been provided, it will be appreciated that other types of storage-related vulnerabilities may be identified according to embodiments of the present disclosure. Additionally, while examples of network-related virtual storage appliance deployment vulnerabilities and storage-related virtual storage appliance deployment vulnerabilities have been discussed, it will appreciated that other virtual storage appliance deployment vulnerabilities may be identified (e.g., host-related virtual storage appliance deployment vulnerabilities, hypervisor-related virtual storage appliance deployment vulnerabilities, etc.).

In some embodiments, identifying 304 the one or more virtual storage appliance deployment vulnerabilities associated with the storage system may include identifying 314 one or more single points of failure in a physical configuration of the storage system associated with deploying the virtual storage appliance. For example, suppose VSA deployment validation process 144 queries 302 storage system 12 to determine that a plurality of virtual networks are mapped onto the same underlying physical switch (e.g., physical switch 420). In this example, physical switch 420 may define a single point of failure for the plurality of virtual networks. Accordingly, failure of physical switch 420 may cause virtual storage appliance 400 to fail or to lose a connection between virtual storage appliance nodes 402, 404. In some embodiments, VSA deployment validation process 144 may identify 304 the mapping of the plurality of virtual networks to the same physical switch as a virtual storage appliance deployment vulnerability in response to identifying 314 physical switch 420 as a single point of failure. While an example of a physical switch being identified 314 as a single point of failure has been provided, it will be appreciated that any physical component of storage system 12 or virtual configuration of the virtual storage appliance configuration file may be identified 314 by VSA deployment validation process 144 to be a single point of failure within the scope of the present disclosure.

In some embodiments, identifying 304 the one or more virtual storage appliance deployment vulnerabilities associated with the storage system may include identifying colocation of a plurality of virtual machines comprising the virtual storage appliance on a single host. Colocation of a plurality of virtual machines may generally include the positioning of multiple virtual machines on the same host. For example, suppose VSA deployment validation process 144 queries 302 hypervisor 124 and determines that a plurality of virtual machines are configured to be deployed on the same host (e.g., frontend system 100). In some embodiments, if each virtual storage appliance node (e.g., virtual storage appliance nodes 402, 404) of a virtual storage appliance (e.g., virtual storage appliance 400) is deployed as a separate virtual machine on the same host, failure of the host may cause complete data unavailability as no virtual storage appliance node would be available for processing data. Accordingly, VSA deployment validation process 144 may identify the colocation of the plurality of virtual machines for the virtual storage appliance nodes on the same host as a virtual storage appliance deployment vulnerability. While an example of colocation of virtual storage appliance nodes deployed on virtual machines has been discussed, it will be appreciated that colocation of virtual machines that are not deploying virtual storage appliance nodes may be identified as well within the scope of the present disclosure.

In some embodiments, identifying 304 the one or more virtual storage appliance deployment vulnerabilities associated with the storage system may include identifying multiple tie-breaker nodes. A tie-breaker node may generally provide increased protection from network failures, because it may resolve situations where one virtual storage appliance node cannot detect the other virtual storage appliance node. In some embodiments, VSA deployment validation process 144 may query 302 storage system 12 and may determine the presence of multiple tie-breaker nodes. The presence of multiple tie-breaker nodes may impact the ability for each tie-breaker node to resolve a split brain situation in a multi-node virtual storage appliance configuration. Accordingly, VSA deployment validation process 144 may identify 304 the presence of multiple tie-breaker nodes as a virtual storage appliance deployment vulnerability.

In some embodiments, VSA deployment validation process 144 may generate 306 a notification including the identified one or more virtual storage appliance deployment vulnerabilities. For example and in response to identifying one or more virtual storage appliance deployment vulnerabilities, VSA deployment validation process 144 may generate 306 a notification (e.g., notification 150) to a user configuring virtual storage appliance 400 on storage system 12. In some embodiments, notification 150 may include a listing of the one or more virtual storage appliance deployment vulnerabilities for display by a computing device (e.g., client device 38). In some embodiments, VSA deployment validation process 144 may include one or more recommendations for resolving the one or more virtual storage appliance deployment vulnerabilities in the generated 306 notification of the one or more virtual storage appliance deployment vulnerabilities. Recommendations may be stored in a database (e.g., storage device 16) or accessed over the Internet based upon, at least in part, the identified one or more virtual storage appliance deployment vulnerabilities.

In some embodiments, VSA deployment validation process 144 may prevent 316 deployment of the virtual storage appliance in response to identifying the one or more virtual storage appliance deployment vulnerabilities. As discussed above and in some embodiments, virtual storage appliance deployment vulnerabilities may generally include virtual storage appliance configurations and/or physical configurations of the storage system that may prevent a virtual storage system from being deployed or may expose the virtual storage appliance or one of its components to potential failure. In some embodiments where the virtual storage appliance configurations and/or physical configurations of the storage system may allow a virtual storage appliance to be deployed but may expose the deployed virtual storage appliance to potential failure, VSA deployment validation process 144 may prevent 316 deployment of the virtual storage appliance. In some embodiments, VSA deployment validation process 144 may prevent 316 deployment of the virtual storage appliance when generating 306 the notification of the one or more virtual storage appliance deployment vulnerabilities. In this manner, even though the virtual storage appliance could be deployed, VSA deployment validation process 144 may prevent 306 the deployment of the virtual storage appliance until the one or more virtual storage appliance deployment vulnerabilities are resolved. In some embodiments, when changes are made to the virtual storage appliance configuration file and/or the physical configuration of the storage system, VSA deployment validation process 144 may re-query 302 the storage system for the physical configuration of the storage system associated with deploying the virtual storage appliance based upon, at least in part, the virtual storage appliance configuration file.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   generating, via a computing device, a virtual storage appliance configuration file in response to receiving one or more configuration parameters from a user via a user interface associated with a virtual storage appliance;
   querying a storage system for physical configuration information associated with deploying the virtual storage appliance based upon, at least in part, the virtual storage appliance configuration file;
   identifying one or more virtual storage appliance deployment vulnerabilities associated with the storage system based upon, at least in part, the virtual storage appliance configuration file and the physical configuration information;
   generating a notification including the identified one or more virtual storage appliance deployment vulnerabilities; and
   preventing deployment of the virtual storage appliance in response to identifying the one or more virtual storage appliance deployment vulnerabilities.

2. The computer implemented method of claim 1, wherein generating the virtual storage appliance configuration file includes receiving one or more parameters of the virtual storage appliance configuration file, wherein the one or more parameters include at least one of:
   one or more storage configuration parameters for the virtual storage appliance;
   one or more network configuration parameters for the virtual storage appliance; and
   one or more host configuration parameters for the virtual storage appliance.

3. The computer implemented method of claim 1, wherein querying the storage system for physical configuration information associated with deploying a virtual storage appliance includes querying a hypervisor of the storage system with one or more application program interfaces (APIs).

4. The computer-implemented method of claim 1, wherein identifying the one or more virtual storage appliance deployment vulnerabilities associated with the storage system includes identifying one or more single points of failure in a physical configuration of the storage system associated with deploying the virtual storage appliance.

5. The computer implemented method of claim 1, wherein identifying the one or more virtual storage appliance deployment vulnerabilities associated with the storage system includes identifying at least one of:
   one or more network-related virtual storage appliance deployment vulnerabilities; and
   one or more storage-related virtual storage appliance deployment vulnerabilities.

6. The computer-implemented method of claim 1, wherein the virtual storage appliance includes a plurality of virtual storage appliance nodes deployed on separate virtual machines.

7. A computer program product residing on a non-transitory computer readable medium having a plurality of instructions stored thereon which, when executed by a processor, cause the processor to perform operations comprising:
   generating a virtual storage appliance configuration file;
   querying a storage system for physical configuration information associated with deploying a virtual storage appliance based upon, at least in part, the virtual storage appliance configuration file;
   identifying one or more virtual storage appliance deployment vulnerabilities associated with the storage system based upon, at least in part, the virtual storage appliance configuration file and the physical configuration information;
   generating a notification including the identified one or more virtual storage appliance deployment vulnerabilities; and preventing deployment of the virtual storage appliance in response to identifying the one or more virtual storage appliance deployment vulnerabilities.

8. The computer program product of claim 7, wherein generating the virtual storage appliance configuration file includes receiving one or more parameters of the virtual storage appliance configuration file, wherein the one or more parameters include at least one of:
   one or more storage configuration parameters for the virtual storage appliance;
   one or more network configuration parameters for the virtual storage appliance; and
   one or more host configuration parameters for the virtual storage appliance.

9. The computer program product of claim 7, wherein querying the storage system for physical configuration information associated with deploying a virtual storage appliance includes querying a hypervisor of the storage system with one or more application program interfaces (APIs).

10. The computer program product of claim 7, wherein identifying the one or more virtual storage appliance deployment vulnerabilities associated with the storage system includes identifying one or more single points of failure in a physical configuration of the storage system associated with deploying the virtual storage appliance.

11. The computer program product of claim 7, wherein identifying the one or more virtual storage appliance deployment vulnerabilities associated with the storage system includes identifying at least one of:
   one or more network-related virtual storage appliance deployment vulnerabilities; and
   one or more storage-related virtual storage appliance deployment vulnerabilities.

12. The computer program product of claim 7, wherein the virtual storage appliance includes a plurality of virtual storage appliance nodes deployed on separate virtual machines.

13. A computing system including a processor and memory configured to perform operations comprising:
   generating a virtual storage appliance configuration file;
   querying a storage system for physical configuration information associated with deploying a virtual storage appliance based upon, at least in part, the virtual storage appliance configuration file;
   identifying one or more virtual storage appliance deployment vulnerabilities associated with the storage system based upon, at least in part, the virtual storage appliance configuration file and the physical configuration information;
   generating a notification including the identified one or more virtual storage appliance deployment vulnerabilities; and
   preventing deployment of the virtual storage appliance in response to identifying the one or more virtual storage appliance deployment vulnerabilities.

14. The computing system of claim 13, wherein generating the virtual storage appliance configuration file includes receiving one or more parameters of the virtual storage appliance configuration file, wherein the one or more parameters include at least one of:
   one or more storage configuration parameters for the virtual storage appliance;
   one or more network configuration parameters for the virtual storage appliance; and
   one or more host configuration parameters for the virtual storage appliance.

15. The computing system of claim 13, wherein querying the storage system for physical configuration information associated with deploying a virtual storage appliance includes querying a hypervisor of the storage system with one or more application program interfaces (APIs).

16. The computing system of claim 13, wherein identifying the one or more virtual storage appliance deployment vulnerabilities associated with the storage system includes identifying one or more single points of failure in a physical configuration of the storage system associated with deploying the virtual storage appliance.

17. The computing system of claim 13, wherein identifying the one or more virtual storage appliance deployment vulnerabilities associated with the storage system includes identifying at least one of:
   one or more network-related virtual storage appliance deployment vulnerabilities; and
   one or more storage-related virtual storage appliance deployment vulnerabilities.

18. The computing system of claim 13, wherein the virtual storage appliance includes a plurality of virtual storage appliance nodes deployed on separate virtual machines.

* * * * *